(12) United States Patent
Wuerfels et al.

(10) Patent No.: US 11,325,196 B2
(45) Date of Patent: May 10, 2022

(54) DOUBLE-SIDED, POLYGONAL CUTTING INSERT WITH ALTERNATING CONCAVE AND CONVEX CUTTING EDGES

(71) Applicant: Kennametal India Limited, Bangalore (IN)

(72) Inventors: Andreas Wuerfels, Essen (DE); Padmakumar Muthuswamy, Bangalore (IN); Bharath Arumugam, Bangalore (IN)

(73) Assignee: KENNAMETAL INDIA LIMITED, Bangalore (IN)

( * ) Notice: Subject to any disclaimer, the term of this patent is extended or adjusted under 35 U.S.C. 154(b) by 0 days.

(21) Appl. No.: 16/915,084

(22) Filed: Jun. 29, 2020

(65) Prior Publication Data

US 2021/0001417 A1 Jan. 7, 2021

(30) Foreign Application Priority Data

Jul. 5, 2019 (IN) .............................. 201941026958

(51) Int. Cl.
*B23C 5/20* (2006.01)
*B23B 27/14* (2006.01)

(52) U.S. Cl.
CPC ............ *B23C 5/207* (2013.01); *B23B 27/145* (2013.01); *B23B 2200/0442* (2013.01);
(Continued)

(58) Field of Classification Search
CPC ...... B23B 2200/0442; B23B 2200/083; B23B 2200/123; B23B 2200/202;
(Continued)

(56) References Cited

U.S. PATENT DOCUMENTS

| 640,716 A | 1/1900 | Sui |
| 3,541,655 A | 11/1970 | Stier |

(Continued)

FOREIGN PATENT DOCUMENTS

| DE | 2533261 B2 | 10/1979 |
| DE | 4020171008610001 | 9/2017 |

(Continued)

OTHER PUBLICATIONS

Seco Product ONEU090520ZZTN4—M14.
(Continued)

*Primary Examiner* — Nicole N Ramos
(74) *Attorney, Agent, or Firm* — Christopher J. Owens

(57) ABSTRACT

A double-sided, polygonal cutting insert includes a first surface and a second surface opposite the first surface. A plurality of side surfaces extend between the first surface and the second surface. A plurality of primary concave cutting edges are formed at an intersection between the plurality of side surfaces and the first and second surfaces, and a plurality of convex wiper edges are formed at an intersection between the plurality of side surfaces and the first and second surfaces. Each wiper edge has a step extending radially outward from a respective side surface. The cutting insert is mounted in a cutting tool such that the primary cutting edge and a wiper edge contact a workpiece to produce a high-quality surface finish on the workpiece.

20 Claims, 4 Drawing Sheets

(52) U.S. Cl.
CPC ... *B23B 2200/083* (2013.01); *B23B 2200/123* (2013.01); *B23B 2200/202* (2013.01); *B23B 2200/208* (2013.01); *B23B 2200/3627* (2013.01); *B23C 2200/0422* (2013.01); *B23C 2200/24* (2013.01)

(58) Field of Classification Search
CPC ...... B23B 2200/208; B23B 2200/3627; B23B 27/145; B23C 2200/0422; B23C 2200/086; B23C 2200/126; B23C 2200/203; B23C 2200/208; B23C 2200/24; B23C 5/06; B23C 5/207
See application file for complete search history.

(56) References Cited

U.S. PATENT DOCUMENTS

| | | | |
|---|---|---|---|
| 4,627,317 | A | 12/1986 | Komanduri |
| 4,971,483 | A | 11/1990 | Kress |
| 5,755,536 | A | 5/1998 | Vollmer |
| 5,915,889 | A | 6/1999 | Kress |
| 5,971,672 | A | 10/1999 | Hansson |
| 6,079,912 | A | 6/2000 | Rothballer |
| 6,164,878 | A | 12/2000 | Satran |
| 6,196,770 | B1 | 3/2001 | Astroem |
| 6,254,316 | B1 | 7/2001 | Strand |
| D460,768 | S | 7/2002 | Svensson |
| 6,503,028 | B1 | 1/2003 | Wallström |
| D482,706 | S | 11/2003 | Svensson |
| 6,641,337 | B1 | 11/2003 | Rothballer |
| 6,769,844 | B2 | 8/2004 | Waggle |
| 7,220,083 | B2 | 5/2007 | Festeau |
| 7,530,769 | B2 | 5/2009 | Kress |
| D651,224 | S | 12/2011 | Takahashi |
| 8,096,735 | B2 | 1/2012 | Sladek |
| 8,858,131 | B2 | 10/2014 | Scheicher |
| 8,915,681 | B2 * | 12/2014 | Ishi .................. B23C 5/06 409/132 |
| 9,233,426 | B2 | 1/2016 | Jansson |
| D760,308 | S | 6/2016 | Krishnegowda |
| 9,475,134 | B2 | 10/2016 | Satran |
| D772,963 | S | 11/2016 | Nam |
| D804,552 | S | 12/2017 | Lee |
| 10,058,936 | B2 * | 8/2018 | Kister .................. B23C 5/207 |
| 10,131,002 | B2 | 11/2018 | Matsumura |
| 2002/0122699 | A1 | 9/2002 | Noggle |
| 2004/0007115 | A1 | 1/2004 | Schwaner |
| 2005/0254908 | A1 * | 11/2005 | Norstrom ............ B23B 27/145 407/113 |
| 2006/0210364 | A1 | 9/2006 | Bellmann |
| 2007/0297865 | A1 * | 12/2007 | Hessman ............ B23C 5/207 407/114 |
| 2012/0070240 | A1 | 3/2012 | Ishi |
| 2012/0155976 | A1 | 6/2012 | Ishi |
| 2013/0094913 | A1 | 4/2013 | Yoshida |
| 2014/0010605 | A1 * | 1/2014 | Smilovici ............ B23C 5/06 407/42 |
| 2014/0044496 | A1 | 2/2014 | Shankaregowda |
| 2014/0341660 | A1 | 11/2014 | Cheon |
| 2015/0071717 | A1 | 3/2015 | Morrison |
| 2016/0082528 | A1 * | 3/2016 | Ballas ............... B23C 5/06 407/48 |
| 2017/0320145 | A1 | 11/2017 | Pettersson |
| 2018/0009044 | A1 | 1/2018 | Koifman |
| 2019/0283148 | A1 * | 9/2019 | Koike ............... B23C 5/2221 |
| 2019/0321898 | A1 * | 10/2019 | Eriksson ........... B23C 5/2221 |

FOREIGN PATENT DOCUMENTS

| | | |
|---|---|---|
| EP | 0084223 | 1/1988 |
| WO | 2014200090 | 12/2014 |
| WO | 2016033620 A1 | 3/2016 |

OTHER PUBLICATIONS

Iscar product OHNU 0806AN-R-W.
Ingersoll product ONCU090612TN-W J.
Jun. 9, 2020 Office Action (non-US) IN App. No. 201741017695A P17-06236-IN-NP.

* cited by examiner

DOUBLE-SIDED, POLYGONAL CUTTING INSERT WITH ALTERNATING CONCAVE AND CONVEX CUTTING EDGES

FIELD OF THE INVENTION

The invention pertains to the field of indexable cutting inserts. More particularly, the invention pertains to an indexable, double sided, polygonal cutting insert with alternating concave and convex cutting edges.

BACKGROUND INFORMATION

Modern high-performance cutting tools use replaceable and typically indexable inserts owing to the high cutting speeds and feeds supported by the superior insert materials. Common materials for inserts include tungsten carbide, polycrystalline diamond and cubic boron nitride.

Indexable inserts use a symmetrical polygonal shape, such that when the first cutting edge is blunt they can be rotated or flipped over, presenting a fresh cutting edge which is accurately located at the same geometrical position. Geometrical repeatability saves time in manufacturing by allowing periodical cutting edge renewal without the need for tool grinding, setup changes, or entering of new values into a CNC program.

Common shapes of indexable inserts include square, triangular and rhombus (diamond) providing four, three and two cutting edges, respectively, on each side of the insert. A double-sided or invertible square insert, for example, can be flipped over to provide eight cutting edges.

The number of cutting edges is directly related to the cost per edge of the cutting insert. The more cutting edges that are available, the more the cutting insert has value. Thus, it is desirable to provide a cutting insert with multiple cutting edges. In addition, it is desirable for a cutting insert that provide a high-quality surface finish.

SUMMARY OF THE INVENTION

The problem of reducing the cost of the cutting insert and providing a high-quality surface finish is solved by providing a double-sided, indexable, polygonal cutting insert that has alternating concave and convex cutting edges. All the concave and convex cutting edges can be used in a single right hand style milling cutter, which provides a true cutting and wiper insert.

An aspect of the present invention is to provide a double-sided, polygonal cutting insert, comprising a first surface, a second surface opposite the first surface, a plurality of side surfaces extending between the first surface and the second surface, each side surface is perpendicular to the first surface and the second surface, a plurality of primary cutting edges formed at an intersection between the plurality of side surfaces and the first surface, a plurality of wiper edges formed at an intersection between the plurality of side surfaces and the first surface, each wiper edge having a step extending radially outward from a respective side surface and formed with a substantially planar outer surface.

Another aspect of the present invention is to provide a double-sided, polygonal cutting insert, comprising a first surface, a second surface opposite the first surface, a plurality of side surfaces extending between the first surface and the second surface, a plurality of primary cutting edges formed at an intersection between the plurality of side surfaces and the first surface and a plurality of primary cutting edges formed at an intersection between the plurality of side surfaces and the second surface, a plurality of wiper edges formed at an intersection between the plurality of side surfaces and the first surface and a plurality of wiper edges formed at an intersection between the plurality of side surfaces and the second surface, each wiper edge having a step extending radially outward from a respective side surface and formed with a substantially planar outer surface.

A further aspect of the present invention is to provide a cutting tool comprising a tool body having a plurality of pockets for mounting a cutting insert, wherein at least one primary cutting edge of a first cutting insert mounted in a first pocket and at least one wiper edge of a second cutting insert mounted in a second pocket contact a workpiece during a cutting operation, thereby producing a high-quality surface finish on the workpiece.

DETAILED DESCRIPTION

FIGS. 1-4 illustrate a cutting insert 10 in accordance with an embodiment of the present invention. The cutting insert 10 may comprise a double-sided, polygonal cutting insert. In the embodiment shown, the cutting insert 10 is of a generally octagonal shape that is symmetric about a central axis 24 and includes four primary cutting edges and four wiper edges on each side for a total of eight primary cutting edges and eight wiper edges. However, it will be appreciated that the invention can be practiced with any suitable shape and any multiple number of primary cutting edges and wiper edges, so long as the number of primary cutting edges is approximately equal to the number of wiper edges.

Figure 1:
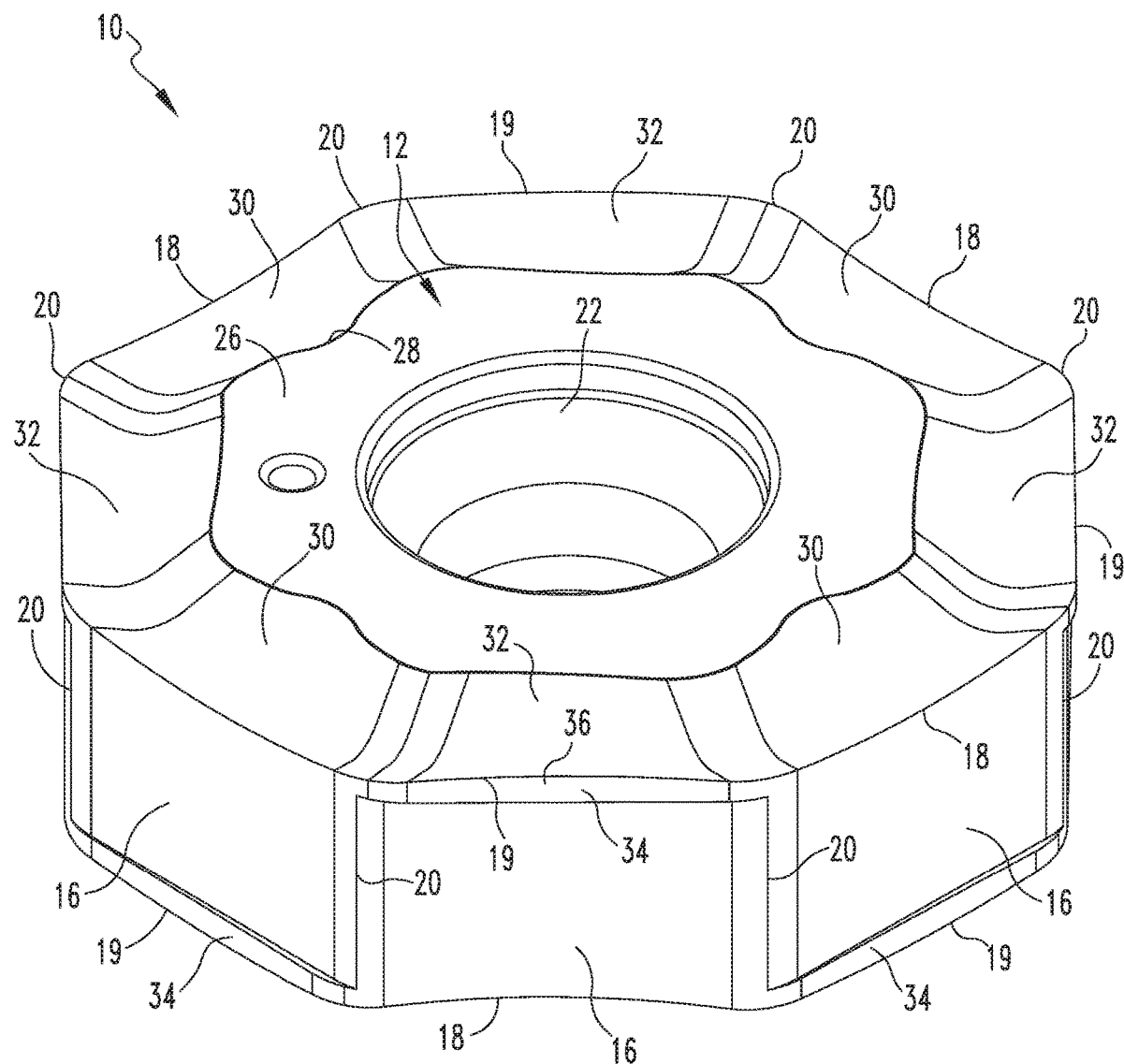
FIG. 1 is an isometric view of a first surface of a cutting insert in accordance with another embodiment of the invention.
Figure 2:
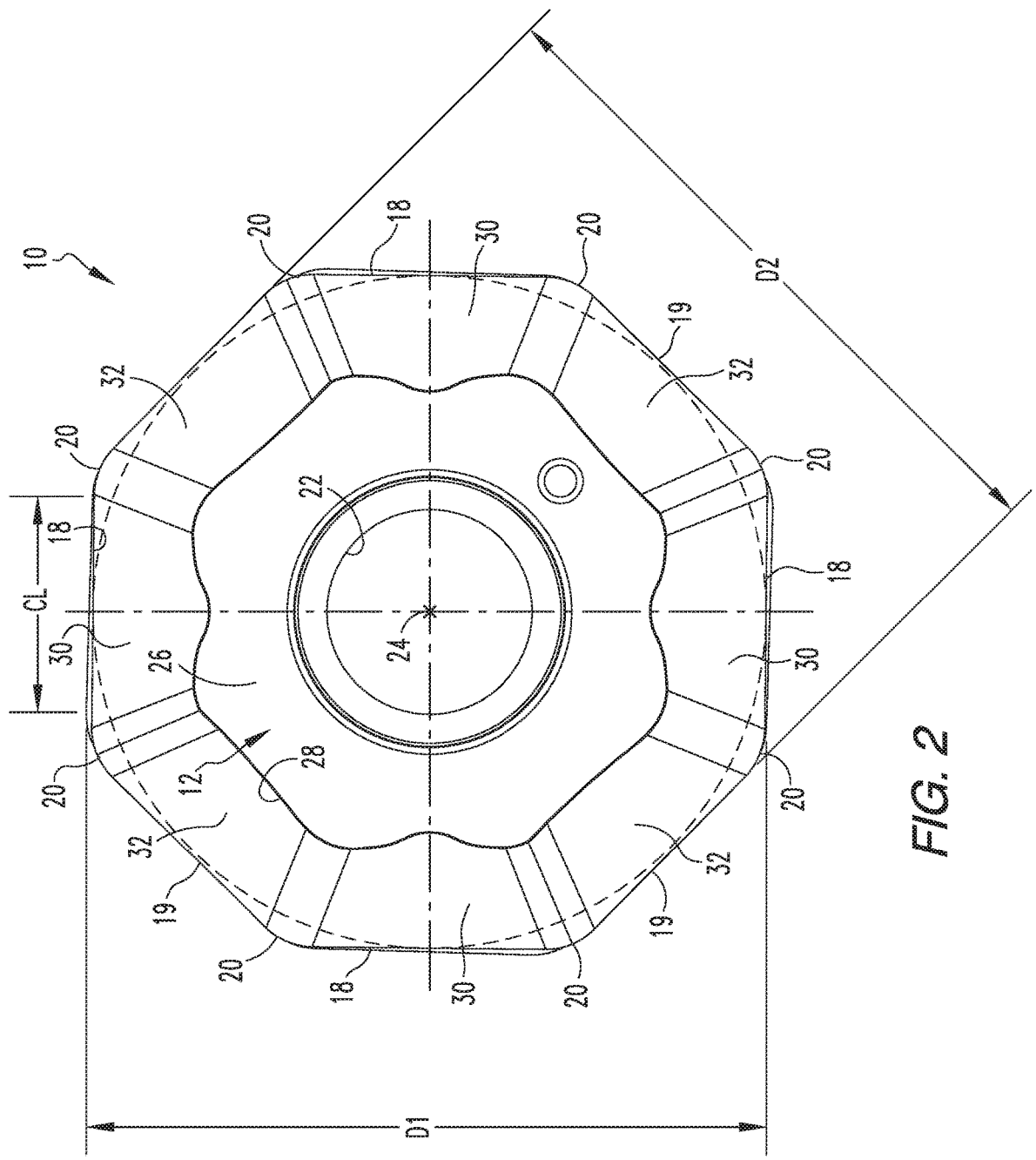
FIG. 2 is a top view of the cutting insert of FIG. 1.
Figure 3:
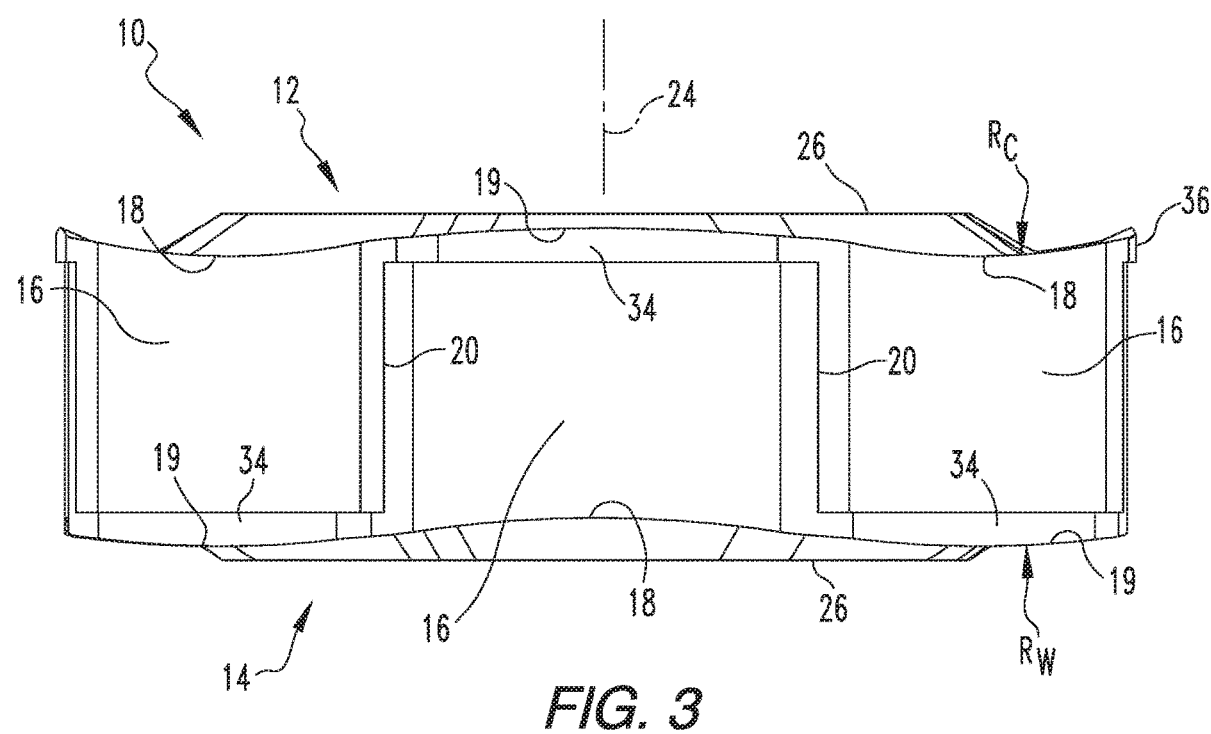
FIG. 3 is a side view of the cutting insert of FIG. 1.

As shown in FIGS. 1-3, the cutting insert 10 includes a first surface 12, a second surface 14 on an opposite side with respect to the first surface 12 and a plurality of side surfaces 16 extending between the first surface 12 and the second surface 14. Because the cutting insert 10 is symmetric about all three axes (x-, y-, z-), only the first surface 12 will be described in detail herein for brevity. However, it will be appreciated that any discussion of the first surface 12 applies to the second surface 14.

In the embodiment shown, each side surface 16 is substantially perpendicular to both the first and second surfaces 12, 14. In other words, the first and second surfaces 12, 14 are substantially parallel to each other and perpendicular to the side surfaces 16. That is, the side surfaces 16 have a facet clearance angle of zero degrees. Thus, both the first and second surfaces 12, 14 of the cutting insert 10 can be presented to the workpiece. In the embodiment shown, the cutting insert 10 has a total of eight side surfaces 16. Each side surface 16 is identical to each other. Thus, only one side surface 16 will be described herein for brevity, and it will be appreciated that any description herein of one of the side surfaces 16 applies to all the side surfaces 16.

A primary cutting edge 18 is formed at the intersection between the first surface 12 and a respective side surface 16 for a total of four primary cutting edges 18. In addition, a primary cutting edge 18 is formed at the intersection between the second surface 14 and a respective side surface 16 for a total of four additional primary cutting edges 18 (i.e. a total of eight primary cutting edges 18 for the cutting insert 10). Each cutting edge 18 is identical to each other. Thus, only one cutting edge 18 will be described herein for brevity, and it will be appreciated that any description herein of one primary cutting edge 18 applies to all the primary cutting edges 18.

Similarly, a wiper edge 19 is formed at the intersection between the first surface 12 and a respective side surface 16 for a total of four wiper edges 19. In addition, a wiper edge 19 is formed at the intersection between the second surface 14 and a respective side surface 16 for a total of four additional wiper edges 19 (i.e. a total of eight wiper edges 19 for the cutting insert 10). Each cutting edge 19 is identical to each other. Thus, only one cutting edge 19 will be described herein for brevity, and it will be appreciated that any description herein of one wiper edge 19 applies to all the wiper edges 19.

Figure 4:
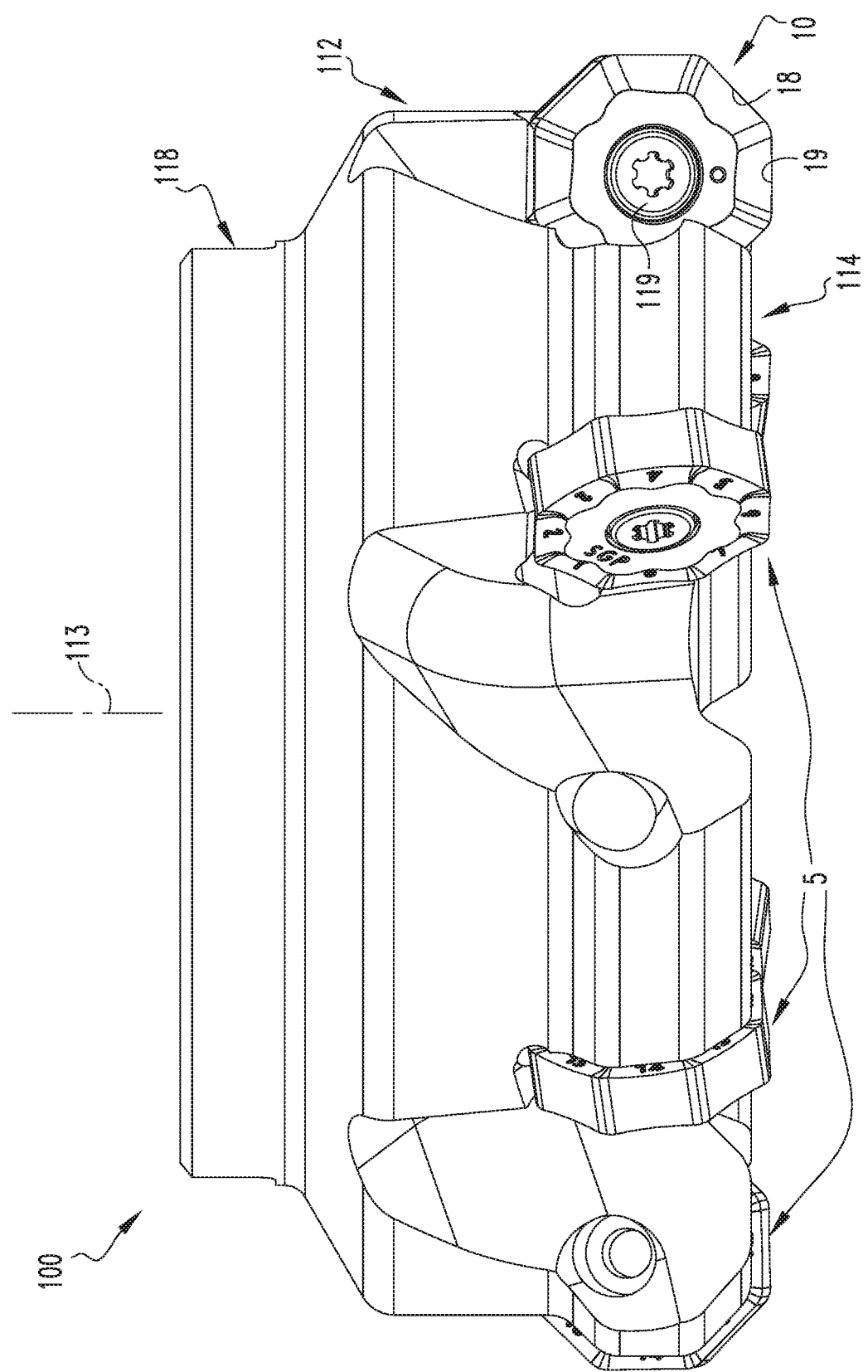
FIG. 4 is a front view of a cutting tool, such as a milling cutter, with the cutting insert of FIG. 1 mounted in a pocket of the cutting tool.

As shown in FIGS. 3 and 4, each primary cutting edge 18 may be formed as a concave edge along the central longitudinal axis 24 and each wiper edge 19 may be formed as a convex edge central longitudinal axis 24. In accordance with an embodiment of the present invention, the central portion of each primary cutting edge 18 may be lower in elevation than the outer portions of the primary cutting edge 18 adjacent to the corner radiuses 20. The primary cutting edge 18 may be formed with a radius, $R_C$, as shown in FIG. 3. For example, the radius $R_C$ may typically range from about 10 to about 100 mm, or from about 15 to about 70 mm depending on the application and the capability of the milling cutter. In a particular embodiment, the radius $R_C$ is about 23.7 mm (0.933 inch). In accordance with an embodiment of the present invention, the central portion of each wiper edge 19 may be higher in elevation than the outer portions of the wiper edge 19 adjacent to the corner radiuses 20. The convex wiper edge 19 may be formed with a radius, $R_W$, as shown in FIG. 3. For example, the radius $R_W$ may typically range from about 10 to about 100 mm, or from about 20 to about 60 mm depending on the application and the capability of the milling cutter. In a particular embodiment, the radius $R_W$ is about 36.4 min (1.433 inches).

As can be seen in FIGS. 1-4, each primary cutting edge 18 is separated by a wiper edge 19. That is, the primary cutting edges 18 and the wiper edges 19 are arranged in an alternating fashion on the same side of the cutting insert 10. In accordance with an embodiment of the present invention, the alternating primary cutting edges 18 and wiper edges 19 form a compound curve between each primary cutting edge 18 and each adjacent wiper edge 19. In addition, the intersection of the first surface 12 and a respective side surface 16 that forms the primary cutting edge 18 also forms the wiper edge 19 at the intersection of the second surface 14 and the same respective side surface 16. Thus, the primary cutting edges 18 and the wiper edges 19 alternate between the first surface 12 and the second surface 14.

Because the cutting insert 10 has an even number of sides 16, there are an identical number of primary cutting edges 18 and wiper edges 19. However, it should be appreciated that the primary cutting edges 18 and the wiper edges 19 can be arranged in a non-alternating fashion.

A corner radius 20 connects each side surface 16 and extends between the first surface 12 and the second surface 14. In certain embodiments, each corner radius 20 has a radius in the range between approximately 0.5 mm to approximately 3.0 mm. For example, the corner radius 20 may have a radius of about 2.0 mm (0.08 inches). Because each corner radius 20 is substantially identical to each other, only one corner radius 2.0 is discussed herein for brevity, and it will be appreciated that any description herein of one corner radius 20 applies to all corner radiuses 20. In accordance with an embodiment of the present invention, the plurality of corner radiuses 20 extend between each of the plurality of primary cutting edges 18 and each of the plurality of wiper edges 19.

The cutting insert 10 also includes a countersunk bore 22 extending through the first and second surfaces 12, 14, and a central longitudinal axis 24. It should be appreciated that the cutting insert is mirror symmetric about all three axes (x-, y- and z-axes). As a result, the cutting insert 10 comprises a double-sided cutting insert in which all sixteen cutting edges 18, 19 at the intersection between the side surfaces 16 and each of the first and second surfaces 12, 14 can separately be used in a machining operation.

The first surface 12 (and the second surface 14) has a topography including a substantially planar central region 26 surrounding the countersunk bore 22. The central region 26 extends from the countersunk bore 22 and terminates in an irregular-shaped boundary 28. The first surface 12 also includes a rake face 30 extending radially inward from each cutting edge 18. In accordance with an embodiment of the present invention, each rake face 30 has a concave topography and is lower in elevation than the central region 26. The rake faces 30 associated with the wiper edges 19 may include unique indicia to identify the wiper edge 19. Alternatively, the rake faces 30 associated with the primary cutting edges 18 may include the unique indicia, or both e primary cutting edges 18 and the wiper edges 19 may include the unique indicia.

Each primary cutting edge 18 and each wiper edge 19 has a cutting-edge length, CL, given by:

$$CL = IC \tan\left[\frac{180°}{\#\ CE}\right] - CR \tag{1}$$

where, IC is the diameter of an inscribed circle of the cutting insert 10; #CE is the number of cutting edges 18, 19 (i.e. equal to 8); and CR is the magnitude of the corner radius 20. For example, for a corner radius equal to 2.0 mm, CR is equal to 2.0.

Thus, for the octagon cutting insert 10 of the illustrated embodiment, the #CE is equal to 8. Thus, each cutting edge 18, 19 of the cutting insert 10 has a cutting-edge length, CL, given by:

$$CL = IC\tan(22.5) - CR \tag{2}$$

An inscribed circle is the largest possible circle that can be drawn inside the cutting insert 10. It should be appreciated that for a polygon, a circle is not actually inscribed unless each side 16 of the cutting insert 10 is tangent to the circle. For a regular polygon, such as the cutting insert 10, an inscribed circle touches the midpoint of each side 16. By contrast, a circumscribed circle touches the corner radius 20 between each side 16 of the cutting insert 10. As will be appreciated, the diameter of the inscribed circle is a function of the size of the cutting insert 10. The larger the cutting insert 10, the larger the diameter of the inscribed circle that can be drawn to touch each of the cutting edges 18.

As shown in FIG. 2, the inscribed circle related to the primary cutting edges 18 has a first diameter, D1, and the inscribed circle related to the wiper edges 19 has a second diameter, D2, which is slightly larger than the first diameter, D1. In one embodiment, the first diameter, D1, is approximately 20.0 mm (0.787 inches) and the second diameter, D2, is approximately 20.2 mm (0.795 inches). The larger, second diameter, D2, is a result of the wiper edges 19 being formed with a step 34 protruding radially outward from the side surface 16. The step 34 is formed with a substantially planar outer face 36.

In accordance with an embodiment of the present invention, the outer face 36 of the step 34 is flat along the length of the wiper edge 19. For example, the substantially planar outer face 36 may extend substantially straight from a first corner radius 20 to a second corner radius 20. In certain embodiments, the substantially planar outer face 36 may be perpendicular to the first and second surfaces 12, 14. Alternatively, the substantially planar outer face 36 may be at an offset angle with respect to the first and second surfaces 12, 14. The substantially planar outer face 36 may be provided at an angle with respect to the side surface 16. Each step 34 has a height along the side surface 16 selected to allow the cutting insert 10 to be mounted in a cutting tool. For example, the height of the step 34 may be less than 30 percent of the height of the side surface 16, for example, the height of the step 35 may be from 5 to 25 percent, or from 10 to 20 percent of the height of the side surface 16. In accordance with an embodiment of the present invention, the step 34 comprises a top surface that intersects with the planar outer face 36 to form the wiper edge 19. As shown in FIGS. 3 and 4, the top surface of the step 34 may be convex along the central longitudinal axis 24 of the cutting insert 10. In certain embodiments, a central portion of the top surface of the step 34 of the wiper edge 19 may be higher in elevation than the adjacent corner portions 20.

Referring now to FIG. 4, a cutting tool 100, for example, a milling cutter, is shown according to an embodiment of the invention. The milling cutter 100 comprises a tool body 112 including a cutting end 114 with a plurality of circumferentially-spaced pockets 116, and a mounting end 118 opposite the cutting end 114. The tool body 112 is designed to be rotatably driven about a central longitudinal axis 113A. In the illustrated embodiment, the milling cutter 100 is commonly known as a right-hand milling cutter and includes a total of six pockets 116. However, it will be appreciated that the invention is not limited by the number of pockets 116, and that the invention can be practiced with any desirable number of pockets that provide the desired cutting capabilities. Each of the pockets 116 can receive a cutting insert, which is securely held in the pocket 116 by means of a mounting screw 119. However, any other suitable method of securing the cutting insert in the pocket may be used, e.g., a clamping wedge, bolts, pins, or the like. In the embodiment shown, the pockets 116 of the cutting tool 100 receive a plurality of conventional cutting inserts 5 and a single cutting insert 10. However, any other suitable arrangement may be used, e.g., two, three, four, five, six or more cutting inserts 10 may be received in the pockets 116 of the cutting tool 100.

The side surfaces 16 of the cutting insert 10 engage the pocket 116 when the cutting insert 10 is mounted in the tool body 112 during cutting operations. In certain embodiments, one of the first and second surfaces 12, 14 and at least two side surfaces 16 should engage the tool body 112 when the cutting insert 10 is properly indexed in the tool body 112. It will be appreciated that each of the cutting edges 18, 19 can be indexed into an active position and effectively utilized in the milling cutter 100, as shown in FIG. 4. It will be appreciated that the number of cutting edges 18, 19 and the number of times that the cutting insert 10 can be indexed depends on the geometric shape of the cutting insert 10. In general, the number of times the cutting insert 10 of the invention can be indexed is equal to the total number of pairs of primary cutting edges 18 and adjacent wiper edges 19. As shown in FIGS. 1-4, the cutting insert 10 can be indexed eight times, unlike conventional rectangular or square cutting inserts with fewer number of cutting edges.

In accordance with an embodiment of the present invention, a single cutting insert 10 can be mounted in a pocket 116 of the milling cutter 100 such that a wiper edge 19 contacts the workpiece. In certain embodiments, the cutting edges of the conventional inserts 5 and the cutting edge 18 of the cutting insert 10 produce a rough cut of the workpiece, while the wiper edge 19 produces a high-quality surface finish on the workpiece, For example, in a milling cutter with a total of six pockets 116, five conventional cutting inserts 5 can be mounted in a respective pocket 116 such that the cutting edge contacts the workpiece, and the cutting insert 10 can be mounted in a respective pocket 116 such that the wiper edge 19 contacts the workpiece, thereby producing a high-quality surface finish on the workpiece. During a cutting operation, at least one primary cutting edge 18 and at least one wiper edge 19 of the cutting insert 10 may be in contact with the workpiece. In certain embodiments, the cutting edges of the conventional inserts 5 may be similar to the cutting edges 18 of the cutting insert 10. In accordance with an embodiment of the present invention, the wiper edge 19 of the cutting insert 10 protrudes axially away from the tool body 112 compared to the cutting edges of the conventional cutting inserts 5. In accordance with an embodiment of the present invention, the wiper edge 19 of the cutting insert 10 may protrude axially away from the tool body 112 compared to the cutting edge 18 of the cutting insert 10.

The patents and publications referred to herein are hereby incorporated by reference.

For purposes of the description above, it is to be understood that the invention may assume various alternative variations and step sequences except where expressly specified to the contrary. Moreover, other than in any operating examples, or where otherwise indicated, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. A double-sided, polygonal cutting insert, comprising:
a first surface;
a second surface opposite the first surface;
a plurality of side surfaces extending between the first surface and the second surface, each side surface is perpendicular to the first surface and the second surface;
a plurality of primary cutting edges formed at an intersection between the plurality of side surfaces and the first surface; and
a plurality of wiper edges formed at an intersection between the plurality of side surfaces and the first surface, each wiper edge having a step protruding radially outward from a respective side surface and radially outward from a central longitudinal axis, wherein each step comprises a substantially planar outer surface and a convex top edge along the central longitudinal axis of the cutting insert.

2. The cutting insert of claim 1, wherein each primary cutting edge is concave along the central longitudinal axis of the cutting insert.

3. The cutting insert of claim 1, wherein the convex wiper edge has a radius, $R_w$, of from 10 to 100 millimeters.

4. The cutting insert of claim 1, wherein the plurality of primary cutting edges and the plurality of wiper edges are arranged in an alternating fashion.

5. The cutting insert of claim 1, wherein each primary cutting edge and each adjacent wiper edge form a compound curve.

6. The cutting insert of claim 1, wherein the second surface is identical to the first surface.

7. The cutting insert of claim 1, further comprising a plurality of corner radiuses extending between the first and second surfaces and each of the plurality of side surfaces.

8. The cutting insert of claim 7, wherein each of the plurality of corner radiuses are identical to each other.

9. The cutting insert of claim 7, wherein the plurality of corner radiuses extend between each of the plurality of primary cutting edges and each of the plurality of wiper edges.

10. The cutting insert of claim 7, wherein a length, CL, of each primary cutting edge and each wiper edge is described by the following equation:

$$CL = IC\tan(22.5) - CR,$$

where,
IC is a diameter of an inscribed circle of the cutting insert, and
CR is equal to a magnitude of the corner radius.

11. A double-sided, polygonal cutting insert, comprising:
a first surface;
a second surface opposite the first surface;
a plurality of side surfaces extending between the first surface and the second surface;
a plurality of primary cutting edges formed at an intersection between the plurality of side surfaces and the first surface, and a plurality of primary cutting edges formed at an intersection between the plurality of side surfaces and the second surface; and
a plurality of wiper edges formed at an intersection between the plurality of side surfaces and the first surface and a plurality of wiper edges formed at an intersection between the plurality of side surfaces and the second surface, each wiper edge having a step extending radially outward from a respective side surface and radially outward from a central longitudinal axis, wherein each step comprises a substantially planar outer surface and a convex top edge along the central longitudinal axis of the cutting insert.

12. The cutting insert of claim 11, wherein each primary cutting edge is concave along the central longitudinal axis of the cutting insert.

13. The cutting insert of claim 11, wherein the convex wiper edge has a radius, $R_w$, of from 10 to 100 millimeters.

14. The cutting insert of claim 11, wherein the plurality of primary cutting edges and the plurality of wiper edges are arranged in an alternating fashion.

15. The cutting insert of claim 11, wherein each primary cutting edge and each adjacent wiper edge form a compound curve.

16. The cutting insert of claim 11, wherein the second surface is identical to the first surface.

17. The cutting insert of claim 11, further comprising a plurality of corner radiuses extending between the first and second surfaces and each of the plurality of side surfaces.

18. The cutting insert of claim 17, wherein each of the plurality of corner radiuses are identical to each other.

19. The cutting insert of claim 17, wherein a length, CL, of each primary cutting edge and each wiper edge is described by the following equation:

$$CL = IC\tan(22.5) - CR,$$

where,
IC is a diameter of an inscribed circle of the cutting insert, and
CR is equal to a magnitude of the corner radius.

20. A cutting tool comprising a tool body having a plurality of pockets for mounting a cutting insert as recited in claim 1, wherein at least one primary cutting edge of a first cutting insert mounted in a first pocket and at least one wiper edge of a second cutting insert mounted in a second pocket contact a workpiece during a cutting operation, thereby producing a high-quality surface finish on the workpiece.

* * * * *